US008428318B2

(12) United States Patent
Zhuo et al.

(10) Patent No.: US 8,428,318 B2
(45) Date of Patent: Apr. 23, 2013

(54) MOTION COMPENSATED IMAGE AVERAGING

(75) Inventors: Lang Zhuo, Singapore (SG); Saravana Kumar, Singapore (SG); Gideon Ho, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 675 days.

(21) Appl. No.: 12/598,592

(22) PCT Filed: May 2, 2008

(86) PCT No.: PCT/SG2008/000158
§ 371 (c)(1),
(2), (4) Date: Nov. 2, 2009

(87) PCT Pub. No.: WO2008/136771
PCT Pub. Date: Nov. 13, 2008

(65) Prior Publication Data
US 2010/0142778 A1    Jun. 10, 2010

Related U.S. Application Data

(60) Provisional application No. 60/924,162, filed on May 2, 2007.

(51) Int. Cl.
*G06K 9/00* (2006.01)
*G06K 9/40* (2006.01)
*G06K 9/64* (2006.01)

(52) U.S. Cl.
USPC ............ 382/128; 382/260; 382/279; 382/275

(58) Field of Classification Search ........................ None
See application file for complete search history.

(56) References Cited

U.S. PATENT DOCUMENTS

| 5,504,523 | A  | * | 4/1996  | Wight et al. | 348/208.4 |
| 6,020,192 | A  |   | 2/2000  | Muzyczka et al. | |
| 6,829,376 | B2 | * | 12/2004 | Bartell | 382/128 |
| 7,251,413 | B2 | * | 7/2007  | Dow et al. | 386/248 |
| 8,254,651 | B2 | * | 8/2012  | Hunt et al. | 382/128 |

FOREIGN PATENT DOCUMENTS

WO    2006048793  A1    5/2006

OTHER PUBLICATIONS

Kumar et al., "Achieving Cellular Resolution for In Vivo Retinal Images of Transgenic GF AP-GFP Mice via Image Processing", Institute of Bioengineering and Nanotechnology, 2008, vol. 16, No. 11. Optics Express??.

(Continued)

*Primary Examiner* — Michelle Entezari
(74) *Attorney, Agent, or Firm* — Klarquist Sparkman, LLP

(57) ABSTRACT

A method is provided for averaging a sequence of image frames. A noise-reducing filter is applied to the image frames to generate filtered frames. A deconvolution filter is applied to the filtered frames to generate corresponding deconvolved frames. The filtered frames are transformed by an affine transformation to align them, generating aligned frames. The aligned frames are motion corrected by non-linear transformation based on intensity rank matching, generating a sequence of motion-corrected frames. The motion-corrected frames are averaged to generate a resultant frame.

15 Claims, 9 Drawing Sheets

OTHER PUBLICATIONS

Zhang et al., "Evaluating the Lateral Resolution of the Adaptive Optics Scanning Laser Ophthalmoscope," Journal of Biomedical, 2006, vol. 11, No. 1, pp. 014002-1-014002-5.

Zhuo et al., "Live Astrocytes Visualized by Green Fluorescent Protein in Transgenic Mice," Developmental Biology, 1997, pp. 36-42, vol. 187.

Morgan et al., "Imaging Techniques in Retinal Research," Experimental Eye Research, 2005, pp. 297-306, vol. 80.

Snyder et al., "Deblurring Subject to Nonnegativity Constraints," IEEE Trans. Signal Processing, 1992, pp. 1143-1150, vol. 40.

Lewis, J. P., "Fast Normalized Cross-Correlation," Vision Interface: Canadian Image Processing and Pattern Recognition Society, 1995, pp. 120-123.

Chinese State Intellectual Property Office, "Office Action", mailed Jun. 22, 2011, in related Chinese Application No. 200880023051.9,and English-language translation.

International Preliminary Report on Patentability, dated Nov. 3, 2009, in related PCT patent application No. PCT/SG2008/000158.

International Search Report and Written Opinion, mailed Jun. 23, 2008, in related PCT patent application No. PCT/SG2008/000158.

* cited by examiner

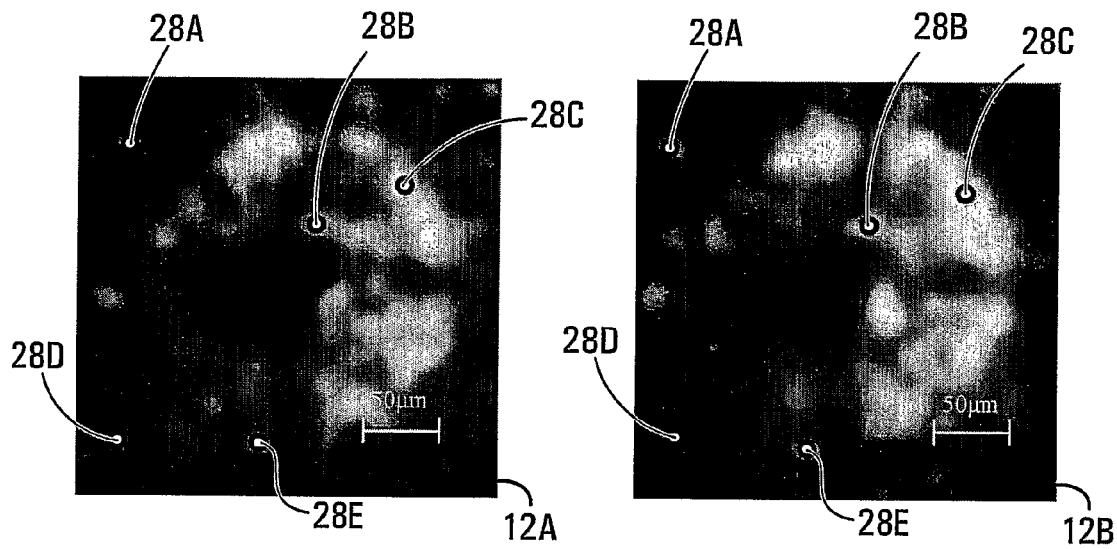
FIG. 4A     FIG. 4B
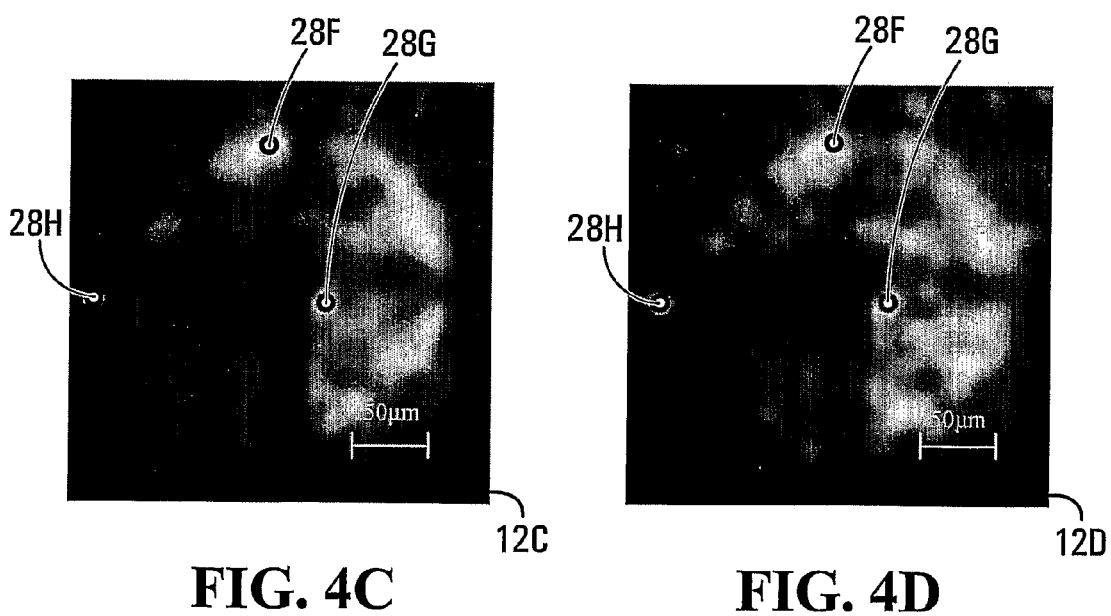
FIG. 4C     FIG. 4D

MOTION COMPENSATED IMAGE AVERAGING

CROSS-REFERENCE TO RELATED APPLICATION

This application claims the benefits of U.S. provisional application No. 60/924,162, filed May 2, 2007, the contents of which are incorporated herein by reference.

FIELD OF THE INVENTION

The present invention relates to image averaging, particularly to averaging a sequence of image frames that require noise filtering and motional correction.

BACKGROUND OF THE INVENTION

It is often necessary or desirable to average multiple images taken from a same object to obtain an averaged image with improve quality, such as with reduced noise. Conventional techniques for averaging image frames do not provide good or satisfactory results in some situations such as when the signal-to-noise ratio (SNR) is very low and the imaged object moves while the different image frames are taken. For example, in vivo fluorescent images of a mouse retina can be obtained based on a technique using the green fluorescence protein (GFP) transgenic mouse model with a glial fibrillary acidic protein (GFAP) promoter, referred to as the GFAP-GFP imaging technique. However, the SNR in GFAP-GFP images of a mouse retina is typically very low and these images are difficult to analyze using conventional techniques.

It is thus desirable to provide an improved method for averaging image frames where the SNR is low and there is motional displacement between different frames.

SUMMARY OF THE INVENTION

In accordance with a first aspect of the present invention, there is provided a method of averaging a sequence of image frames taken from a living object with a fluorescent imaging technique, the method comprising: applying a noise-reducing filter to the image frames to generate a sequence of filtered frames; applying a deconvolution filter to the sequence of filtered frames to generate a corresponding sequence of deconvolved frames; subjecting the deconvolved frames to a motion-correction transformation to generate a sequence of corrected deconvolved frames, wherein the ith corrected deconvolved frame is represented by $J_i^{ref}(x,y)$, $J_i^{ref}$ being the intensity at image point (x,y) in the ith corrected deconvolved frame; transforming the filtered frames by an affine transformation to align the filtered frames, thus generating a sequence of aligned frames, wherein an ith aligned frame is represented by $I_i^a(x,y)$, $I_i^a$ being the intensity at image point (x,y) in the ith aligned frame; relocating image points in each aligned frame to generate a motion-corrected frame, wherein an ith motion-corrected frame is represented by $I_i^n(x,y)$, $I_i^n$ being the intensity at image point (x,y) in the ith motion-corrected frame, $I_i^n(x,y)=I_i^e(x_p,y_p)$, and wherein the location $(x_p,y_p)$ is selected such that (i) the location is within a neighborhood centered around (x,y), and (ii) an intensity rank of $I_i^a(x_p,y_p)$ in the neighborhood and an intensity rank of $J_{i-1}^{ref}(x,y)$ in the neighborhood are the same, thus generating a sequence of motion-corrected frames; and averaging the motion-corrected frames to generate a resultant frame. Assuming the total number of motion corrected frames is N, the averaging may comprise generating a sequence of reference frames, wherein an ith one of the reference frames is represented by $I_i^{ref}$ and is calculated as $$I_i^{ref} = \frac{(i-1) \times I_{i-1}^{ref} + I_i^n}{i};$$

and generating the resultant frame according to $I_A = I_N^{ref}$, $I_A$ representing the resultant frame. The motion-correction transformation of the deconvolved frames may comprise transforming the deconvolved frames by an affine transformation to align the deconvolved frames, thus generating a sequence of aligned deconvolved frames, wherein an ith aligned deconvolved frame is represented by $J_i^a(x,y)$, $J_i^a$ being the intensity at image point (x,y) in the ith aligned deconvolved frame; relocating image points in each aligned deconvolved frame to generate a motion-corrected deconvolved frame, wherein an ith motion-corrected deconvolved frame is represented by $J_i^n(x,y)$, $J_i^n$ being the intensity at image point (x,y) in the ith motion-corrected deconvolved frame, $J_i^n(x,y)=J_i^a(x_0,y_0)$, and wherein the location $(x_0,y_0)$ is selected such that (I) the location $(x_0,y_0)$ is within a neighborhood centered around (x,y), and (ii) an intensity rank of $J_i^a(x_0,y_0)$ in the neighborhood and an intensity rank of $J_{i-1}^{ref}(x,y)$ in the neighborhood are the same. The ith corrected deconvolved frame may be generated according to $$J_i^{ref} = \frac{(i-1) \times J_{i-1}^{ref} + J_i^n}{i}.$$

The method may further comprise establishing point-to-point correlation between corresponding landmark points in each adjacent pair of the deconvolved frames; and establishing point-to-point correlation between corresponding landmark points in each adjacent pair of the filtered frames, guided by the point-to-point correlation between the corresponding landmark points in the deconvolved frames; wherein the transforming the filtered frames by the affine transformation comprises aligning corresponding landmark points in each adjacent pair of the aligned frames. The establishing point-to-point correlation between the corresponding landmark points in the each adjacent pair of the deconvolved frames may comprises calculating a normalized cross-correlation (NCC) measure for each pair of the corresponding landmark points; determining that the pair of landmark points are correlated when the NCC measure satisfies a pre-selected condition.

In accordance with a second aspect of the present invention, there is provided a method of averaging a sequence of image frames taken from a living object with a fluorescent imaging technique, the method comprising: applying a noise-reducing filter to the image frames to generate a sequence of filtered frames; applying a deconvolution filter to the sequence of filtered frames to generate a corresponding sequence of deconvolved frames; determining landmark points in the deconvolved frames, by identifying, in each deconvolved frame, image points that have a peak intensity; establishing point-to-point correlation between corresponding landmark points in each adjacent pair of the deconvolved frames; establishing point-to-point correlation between corresponding landmark points in each adjacent pair of the filtered frames, guided by the point-to-point correlation between the corresponding landmark points in the deconvolved frames; transforming the filtered frames by an affine transformation to sequentially align the filtered frames, thus generating a sequence of aligned frames; transforming the aligned frames by a non-linear transformation for motion correction, thus generating a sequence of motion-corrected frames; and averaging the motion-corrected frames to generate a resultant frame. The point-to-point correlation between the corresponding landmark points in the each adjacent pair of the deconvolved frames may be established by: calculating a normalized cross-correlation (NCC) measure for each pair of the corresponding landmark points; determining that the pair of landmark points are correlated when the NCC measure satisfies a pre-selected condition.

In accordance with a third aspect of the present invention, there is provided a method of averaging a sequence of image frames taken from a living object with a fluorescent imaging technique, the method comprising: applying a multi-scale Gaussian filter to the image frames for noise reduction, thus generating a sequence of filtered frames; applying a deconvolution filter to the filtered frames, thus generating a sequence of deconvolved frames; extracting intensity maxima as landmark points from the deconvolved frames; tracking landmark points in the deconvolved frames using normalized cross-correlation; aligning the filtered frames by an affine transformation with reference to the tracked landmark points, thus generating aligned frames; transforming the aligned frames by a non-linear transformation for motion correction, thus generating motion corrected frames; and averaging the motion corrected frames to generate a resultant frame. The tracking the landmarks in the deconvolved frames may comprise establishing point-to-point correlation between corresponding landmark points in each adjacent pair of the deconvolved frames; the method further comprising establishing point-to-point correlation between corresponding landmark points in each adjacent pair of the filtered frames, guided by the point-to-point correlation between the corresponding landmark points in the deconvolved frames; wherein the aligning the filtered frames comprises aligning corresponding landmark points in each adjacent pair of the aligned frames.

In the above method according to the second or third aspect of the present invention, an ith one of the motion corrected frames may be represented by $I''_i$, where i=1 to N, N being the total number of motion corrected frames, and wherein the averaging may comprise generating a sequence of reference frames, an ith one of the reference frames is represented by $I_i^{ref}$ and is calculated as $$I_i^{ref} = \frac{(i-1) \times I_{i-1}^{ref} + I_i^n}{i};$$

and generating the resultant frame according to $I_A = I_N^{ref}$, $I_A$ representing the resultant frame.

In each of the above method according to an aspect of the present invention, the sequence of filtered claims may be generated by applying a plurality of Gaussian filters to each one of the image frames to generate a plurality of Gaussian maps associated with the each image frame, each one of the Gaussian filters is characterized by a distinct filter width and a standard deviation dependent on the filter width; generating a filtered frame corresponding to the each image frame, by assigning each image point in the filtered frame an intensity equaling a maximum intensity at the each image point in the plurality of Gaussian maps associated with the each image frame, thus generating the first sequence of the filtered frames. The intensity, $M_{i,j}(x,y)$, at an image point (x,y) in the jth Gaussian map associated with the ith image frame in the sequence of image frames may be calculated by $$M_{i,j}(x,y) = \sum_{x_j} \sum_{y_j} h_j(x-x_j) h'_j(y-y_j) I_i(x_j, y_j),$$

where the summation is over possible $x_j$ and $y_j$ that satisfy $(x-w_j) \leq x_j \leq (x+w_j)$ and $(y-w_j) \leq y_j \leq (y+w_j)$, and wherein $I_i(x,y)$ is the intensity at the image point (x,y) in the ith image frame, $h_j(u) = \exp(-u^2/2\sigma_j^2)$ is a Gaussian transfer function for the jth Gaussian filter, u representing a one dimensional variable, $h'_j(u)$ is the transpose of $h_j(u)$, $\sigma_j$ is a standard deviation, and $w_j$ is a filter width for the jth Gaussian filter. For example, $w_j=j$. The $\sigma_j$ may be selected so that it has the largest value that satisfies $\exp(-w_j^2/2\sigma_j^2) \leq 10^{-3}$. The Gaussian filters for each frame may consists of 3 to 10 Gaussian filters. The living object may be a mouse retina. The fluorescent imaging technique may be a glial fibrillary acidic protein-green fluorescence protein (GFAP-GFP) imaging technique.

In accordance with a further aspect of the present invention, there is provided a computer comprising a processor and a computer readable medium storing thereon computer-executable instructions which, when executed by the processor, adapts the computer to perform the method according to any one of the above aspects of the present invention.

In accordance with another aspect of the present invention, there is provided a computer readable medium storing thereon computer-executable instructions which, when executed by a processor, adapts the processor to perform the method according to any one of the above aspects of the present invention.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

FIGS. 4A, 4B, 4C, and 4D are representative adjacent frames in a sequence of input frames;

DETAILED DESCRIPTION

An exemplary embodiment of the present invention relates to an automated image frame averaging method, which can provide improved results even when the signal-to-noise-ratio (SNR) in the input image frames is very low (e.g. SNR<1). The method incorporates filtering and motion correction/compensation techniques aimed at reduce noise and to correct/compensate for motional distortion.

Figure 1A:
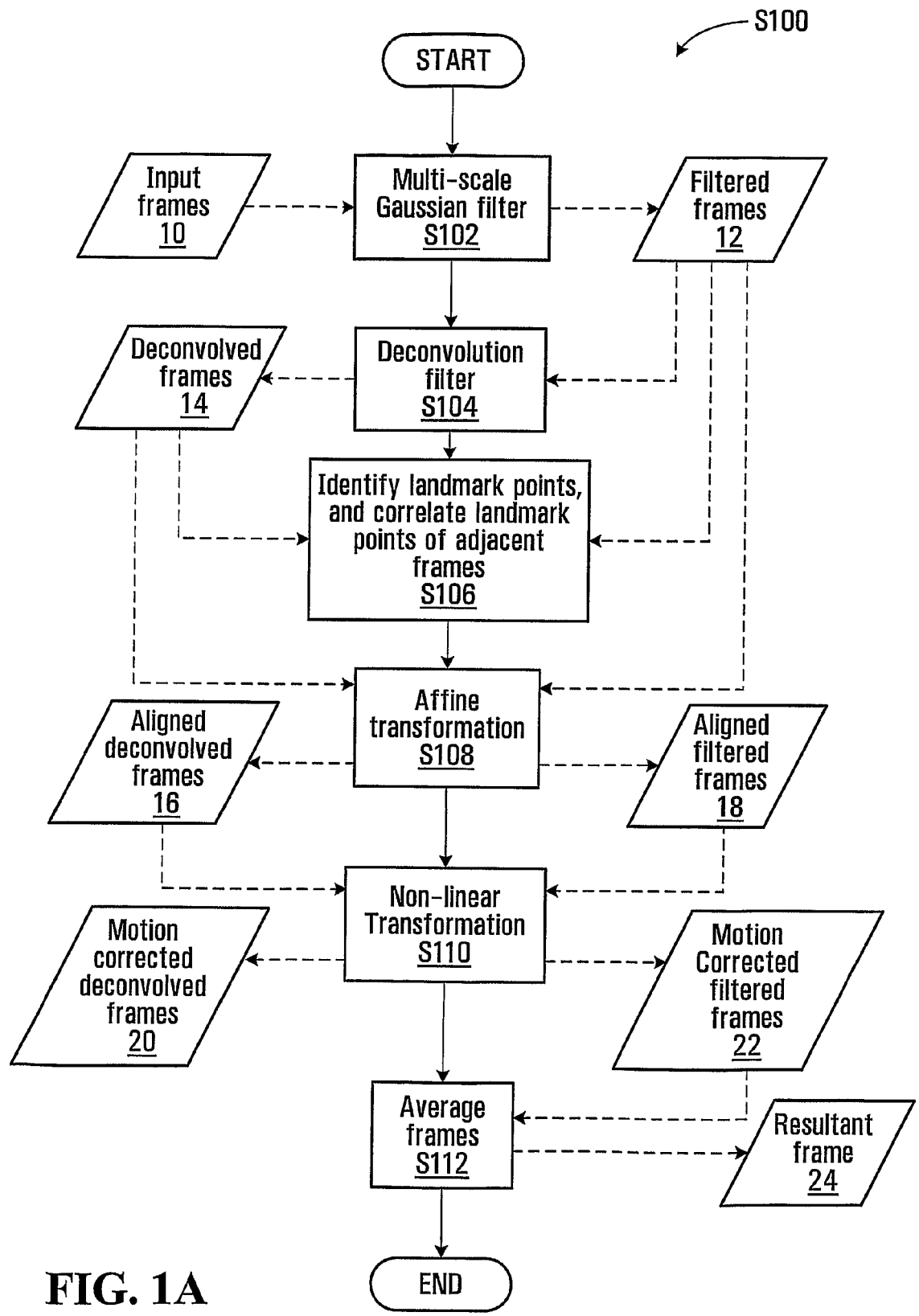
FIGS. 1A, 1B, and 1C are flowcharts for a frame averaging process, exemplary of an embodiment of the present invention.

A flowchart illustrating the exemplary method S100 for averaging a sequence of image frames 10, is shown in FIG. 1A.

For the description below, it is assumed that N input frames 10 are to be averaged. The input frames are assumed to be taken from a living object, using a fluorescent imaging technique in a time sequence. The input frames 10 may be raw images taken from the living object, or may be or include pre-processed image frames.

For example, the input image frames may be raw images of a transgenic mouse retina taken using the GFAP-GFP (glial fibrillary acidic protein-green fluorescence protein) imaging technique. The GFAP-GFP imaging technique is described in L. Zhuo et al., "Live astrocytes visualized by green fluorescent protein in transgenic mice," *Developmental Biology*, 1997, vol. 187, pp. 36-42, 1997; and J. Morgan et al., "Imaging techniques in retinal research," *Experimental Eye Research*, 2005, vol. 80, pp. 297-306, the entire contents of which are incorporated herein by reference. Briefly, the images of fluorescent labeled cells in the optic disc of the mouse may be captured by a scanning laser opthalmoscope (SLO) where the mouse retina is scanned with a laser beam from a point source and the fluorescence emitted is then collected by a photomultiplier. The un-averaged raw fluorescence images typically have poor signal to noise ratio (SNR), and are difficult to use for diagnostic purposes, and the like. Further, due to respiratory motion, the field of view for a raw image frame may be displaced from that of a raw image taken at a different time in the sequence.

For illustration purposes, it is also assumed that the input frames 10 are rasterized—e.g. two dimensional (2D) images expressed in the (x,y) Cartesian coordinate. Each input frame 10 is assigned an integer index "i", where i=1, 2, ..., N, indicating the order of the frame in the sequence. The intensity ("I") of an image point (pixel) of the ith input frame can be represented by $I_i(x,y)$, where x and y are the coordinates of the image point in the ith input frame. The ith input frame may also be referred to as $I_i$.

Briefly, at S102, a multi-scale Gaussian filter is applied to each of the input frames 10 to suppress noise while preserving spatial resolution, thus generating a corresponding sequence of N filtered frames 12. The filtered frames are then aligned with one another to generate aligned filtered frames 18, through S104, S106 and S108, as will be further described below. Each aligned filtered frame is then non-linearly transformed to correct for motional distortion, thus generating a sequence of motion-corrected filtered frames 22 at S110. The motion-corrected filtered frames 22 may be averaged to generate a resultant frame 24 at S112.

Figure 1B:
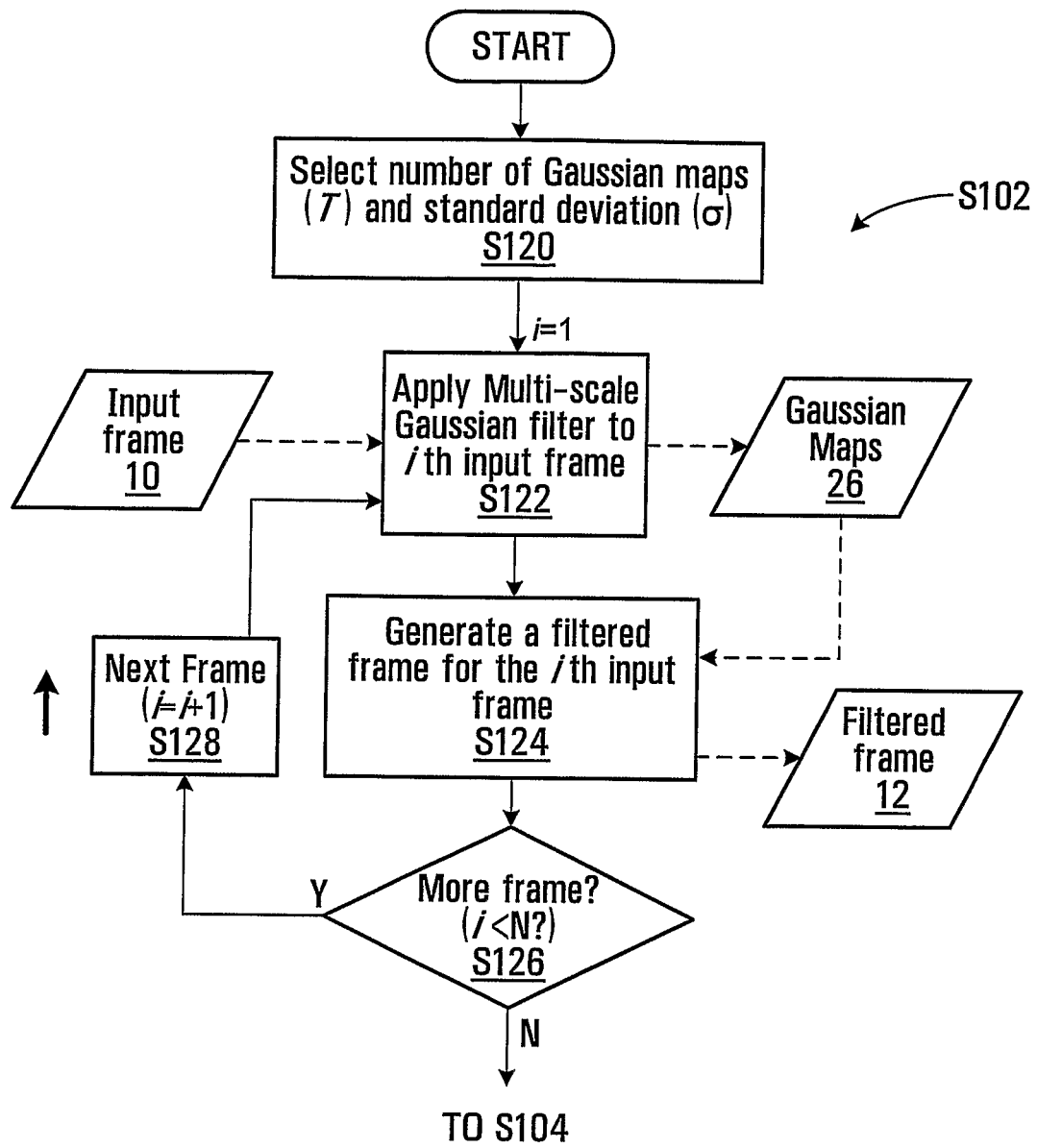

Exemplary multi-scale Gaussian filtering at S102 is illustrated with more detail in FIG. 1B.

The transfer function for a one-dimensional, lowpass Gaussian filter in the frequency domain has the general form:

$$h(u)=\exp(-u^2/2\sigma^2), \quad (1)$$

where u represents a one dimension variable (e.g. an x or y coordinate of the image point or a distance) and σ is the standard deviation of the Gaussian curve. Each transfer function is characterized by the parameter σ.

Further, to transfer each image point from the input image to a filtered image, the transfer function may be applied to a neighborhood centered around the particular image point. The shape and the size of the neighborhood will have an effect on the transfer result. For simplicity and ease of operation, it is typical to use a square neighborhood which is characterized by its width. For illustration purposes, square neighborhoods are used herein for Gaussian filtering. The width (w) of the filtering neighborhood for a Gaussian filter is referred to herein as the filter width for the corresponding Gaussian transfer function or Gaussian filter, and is also a parameter that characterizes the particular Gaussian filter. It is assumed below that the neighborhood of an image point at ($x_c,y_c$) is a square region defined by ($x_c-w$)≦x≦($x_c-w$) and ($y_c-w$)≦y≦($y_c-w$), which has a size (2w+1)×(2w+1). It should be understood that different shapes of neighborhood may be used in Gaussian filtering.

The filtering outcome will depend on the parameter values of σ and w.

In this embodiment, multiple Gaussian transfer functions of the form of equation (1) but with different characterizing parameters are applied to each input frame 10 to obtain different Gaussian maps 26 associated with the particular input frame. These transfer functions are denoted $h_j$, where j=1, 2..., T. T is the total number (T) of maps 26 to be generated, which may vary in different applications, depending on factors that may include the nature of the input images to be processed, the processing speed, the desired quality and the like.

The jth Gaussian transfer function, $h_j$, has the form:

$$h_j(u)=\exp(-u^2/2\sigma_j^2). \quad (2)$$

For different transfer functions, the corresponding filter widths for the filtering neighborhood are different. It is assumed below that for transfer function $h_j$, the corresponding width is $w_j$=j. Thus, the filter width $w_j$ varies from 1 to T. In different embodiments, the width values may be selected differently. For example, the width may be selected according to $w_j$=2j.

The standard deviation $\sigma_j$ for transfer function $h_j$ is selected so that it has the largest value that satisfies the inequality:

$$\exp(-w_j^2/2\sigma_j^2)\leq 10^{-3}. \quad (3)$$

In different embodiments, the value of $\sigma_j$ may be selected differently depending on the application. For example, the value on the right-hand side of inequality (3) may be $10^{-3}$, $10^{-4}$, $10^{-5}$, or $10^{-6}$. Generally, this value should be selected so that it is negligible in comparison with the peak value of $h_j(u)$ in Equation (2).

At S120, a suitable value for T is initially selected. T may be any suitable integer. The value of T may be determined by selecting the largest value that satisfies $2^T \leq D$, where D is the number of image points or pixels in a given dimension in the input image, such as the height or width of the image. For example, T may have a value of 2 to 10. For illustration purposes, it is assumed below that T=10. Thus, ten Gaussian transfer functions are constructed, and the filter widths are 1, 2, 3, ..., 10, respectively.

A suitable $\sigma_j$ is also selected for each transfer function $h_j$, which satisfies the condition in Equation (3).

At S122, each of the ten Gaussian transfer functions is applied to each input frame 10 to produce ten Gaussian maps 26, denoted M, for that input frame. The Gaussian map $M_{i,j}$(x,y) for input frame "i" produced by $h_j$ is given by, $$M_{i,j}(x, y) = \sum_{x_j}\sum_{y_j} h_j(x - x_j)h'_j(y - y_j)I_i(x_j, y_j), \quad (4)$$

where the sum is over all possible image points $(x_j, y_j)$ within the neighborhood of (x,y) with a width of $w_j$. That is, $(x-w_j) \leq x_j \leq (x+w_j)$ and $(y-w_j) \leq y_j \leq (y+w_j)$. The function $h'_j(y-y_j)$ is the transpose of $h_j(y-y_j)$.

For a given image point coordinate, e.g., (x, y), its intensity in the jth map is given by $M_{i,j}(x,y)$, which may be different from its intensity in another Gaussian map. The maximum intensity at the image point (x, y) in all of the ten Gaussian maps 26 for a given input frame "i" is denoted $M_{i,max}(x,y)$. Thus, $M_{i,max}(x,y) = \arg\max M_{i,j}(x,y)$ for j=1 to T.

A filtered frame 12, $I'_i$, corresponding to the input frame 10 $I_i$, is generated so that $$I'_i(x,y) = M_{i,max}(x,y). \quad (5)$$

Thus, the intensity at each image point in the filtered frame 12 is the maximum intensity for that image point from all of the (ten) Gaussian maps 26 for that particular frame. This is expected to have the effect of enhancing the actual input frame A enhancing the fluorescent signal from the mouse retina in the input frame, and thus increasing the signal-to-noise ratio (SNR).

While another statistical measure of the intensity distribution within the neighborhood, such as the average intensity, may also be used as the filtered intensity, it has been found that the maximum intensity provides a better result.

At S126, a decision is made with respect to whether there is a next frame to be processed. If there is, the index "i" is incremented by 1 at S128, and the next frame, (i+1)th frame, is processed by repeating S122 and S124. The same values of T and $\sigma_j$ may be used for all input frames.

This procedure is repeated for all input frames 10, so that a filtered frame 12 is generated for each input frame 10.

Next, at S104 in FIG. 1A, a sequence of deconvolved frames 14 is further generated from the sequence of filtered frames 12. In the sequence of deconvolved frames 14, the ith deconvolved frame, which is generated from the ith filtered frame, is denoted as $J_i(x,y)$.

In the present embodiment, each filtered frame 12, $I'_i$, is subjected to two dimensional deconvolution filtering to enhance contrast and remove background noise. Deconvolution may be carried out according to a suitable known deconvolution technique. An exemplary suitable technique is disclosed in D. L. Snyder, T. J. Schulz, and J. A. O'Sullivan, "Deblurring subject to nonnegativity constraints," *IEEE Trans. Signal Processing*, 1992, vol. 40, pp. 1143-1150, the entire contents of which are incorporated herein by reference. The deconvolution filtering may be applied using an algorithm based on the Classic Maximum Likelihood Estimation method.

When the input frames 10 are raw frames of a GFAP-GFP image, the deconvolved frames 14 are expected to show the underlying fluorescent profiles more clearly, with much reduced background noise.

Figure 1C:
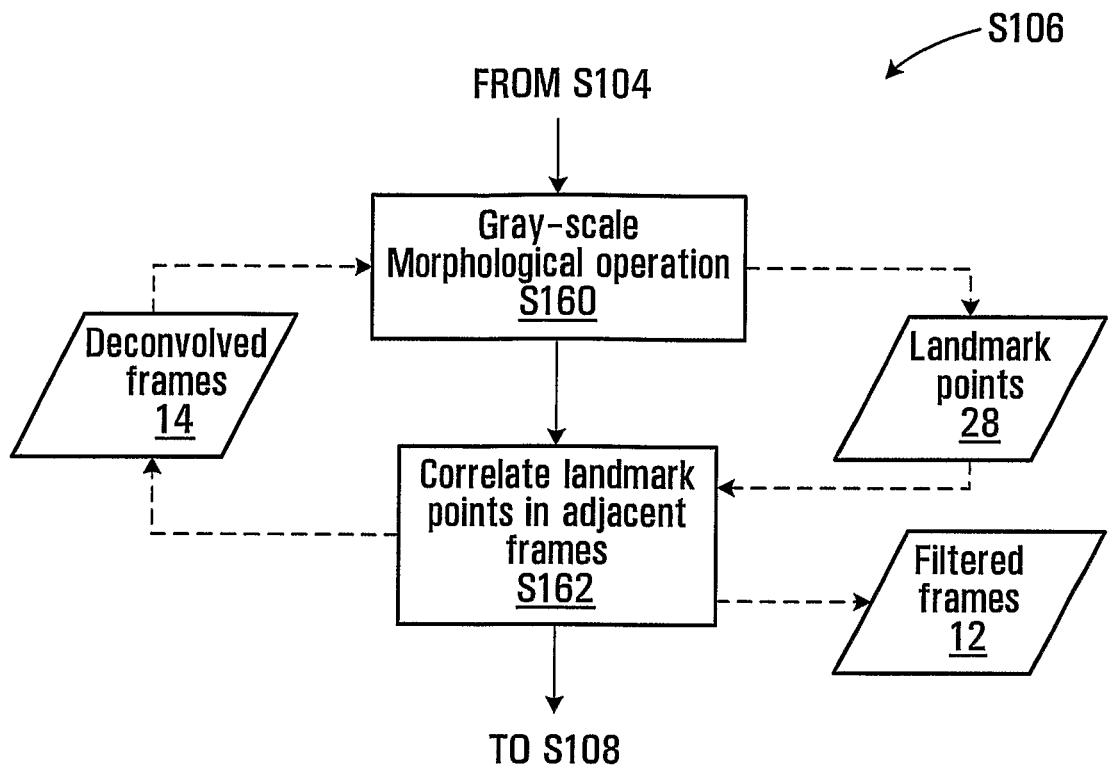

At S106, the landmark points in the filtered frames 12 are identified, such as according to the procedure shown in FIG. 1C.

At S160, the deconvolved frames are analyzed using a gray-scale morphological operation, such as the technique disclosed in P. Soille, *Morphological image analysis: principles and applications,* 1999, pp. 170-171, Springer-Verlag, the entire contents of which are incorporated herein by reference. This gray-scale morphological operation can identify the locations of intensity maxima in each deconvolved frame 14 ($J_i$). The image points at these locations are considered to be the landmark points. The intensity maxima in the GFAP-GFP images typically reflect the fluorescent signal from a fluoresce-label, which is typically well localized in space and is thus sensitive to motional displacement in any direction. The intensity at a maximum is also likely less distorted by noise. Thus, these intensity maxima are expected to provide accurate indication of motional displacement.

The coordinates of the landmark points 28 may be automatically obtained based on the intensity maxima as described above.

It can be assumed that the corresponding image points in the corresponding filtered frame $I_i$ are also landmark points. Thus, the image points at the same coordinates 28 in the corresponding filtered frame are also identified as landmark points.

This process is repeated for each deconvolved frame 14 and the corresponding filtered frame 12.

At S162, the landmark points in each pair of adjacent deconvolved frames 14 are correlated. This is performed using a normalized cross-correlation (NCC) technique, as described in J. P. Lewis, "Fast normalized cross-correlation," in *Vision Interface*: Canadian Image Processing and Pattern Recognition Society, 1995, pp. 120-123, the entire contents of which are incorporated herein by reference.

Briefly, a NCC measure (NCC) for a landmark point (u, v) of the deconvolved frame $J_i$ and a landmark point (u', v') of its adjacent deconvolved frame $J_{i-1}$ is defined as:

$$NCC_{j_{i,u,v}, j_{i-1,u',v'}} = \frac{\langle j_{i,u,v} - \bar{j}_{i,u,v}, j_{i-1,u',v'} - \bar{j}_{i-1,u',v'} \rangle}{|j_{i,u,v} - \bar{j}_{i,u,v}||j_{i-1,u',v'} - \bar{j}_{i-1,u',v'}|}, \quad (6)$$

where $J_{i,u,v}$ is a $(2Wc+1) \times (2Wc+1)$ neighborhood centered around the landmark point (u, v) in frame $J_i$, and $\bar{j}_{i,u,v}$ is the mean intensity of this neighborhood; is a $(2Wc+1) \times (2Wc+1)$ neighborhood centered around the landmark point (u', v') in frame $J_{i-1}$, and $\bar{j}_{i-1,u',v'}$ is the mean intensity of this neighborhood. The notation "$\langle \cdot \rangle$" denotes the dot operator, whereas "$|\cdot|$" denotes the magnitude operator.

The value of Wc may be empirically selected. For example, Wc may be 32. The value of Wc may be selected so that the observed maximum displacement of any corresponding image point between different frames in the field of view remains within a block of this width $[(2Wc+1) \times (2Wc+1)]$ for all image frames in the sequence.

The point-to-point correspondence, or correlation, between (u,v) and (u',v') is established if the following conditions are satisfied:
  A. (u, v) lies within the $(2Wc+1) \times (2Wc+1)$ neighborhood of (u', v');
  B. the NCC measure given in Equation (6) is the largest within the $(2Wc+1) \times (2Wc+1)$ neighborhood and
  C. the NCC measure is higher than a pre-selected threshold $NCC_{th}$.

The threshold $NCC_{th}$ may be empirically selected. For example, in one embodiment, $NCC_{th}=0.9$. $NCC_{th}$ should be large enough so that spurious landmark points are avoided but at the same time it should be low enough such that not too many valid landmark points are excluded. In some applications, $NCC_{th}$ is typically in the range from 0.7-0.9.

The landmark points in the adjacent deconvolved frames 14 that satisfy the above conditions are considered correlated image points.

The same landmark points are also considered correlated in the corresponding filtered frames 12. In other words, the establishment of point-to-point correlation between corresponding landmark points in each adjacent pair of filtered frames 12 are guided by the point-to-point correlation between the landmark points in the deconvolved frames 14.

The procedure described here for identifying and correlating landmark points conveniently provides certain advantages. For example, it does not require extensive computation, since a single NCC operation is suffice to determine the correspondence between any two landmark points in adjacent frames. The sensitivity of NCC to rotation in the localized neighborhoods of the landmark points is avoided since they have isotropic profiles.

While landmark points may be directly identified and correlated from the filtered frames 12, using the deconvolved frames 14 as described herein may be more convenient in cases where the filtered frames 12 still contain a high level of background noise thus making it difficult to accurately identify and correlate landmark points.

Using intensity maxima from the underlying fluorescence profiles (deconvolved frames) to identify landmark points is also advantageous since these maxima points are well localized in space and therefore are sensitive to positional changes in any given direction. The selection of the intensity maxima can also be automated, thus providing an automated method of obtaining a reasonably large number of landmark points.

As can be appreciated, each filtered frame 12 may have several landmark points with corresponding points in the adjacent filtered frame 12. After the correlation between the landmark points in each pair of adjacent frames 12 has been established, the adjacent frames may be sequentially aligned (also referred to as co-registered) so that the corresponding landmarks have the same coordinates after alignment.

Sequential alignment refers to a sequence of alignment transformation wherein all frames in a sequence are aligned to an initial reference frame (e.g. the first frame) by determining the transformation between unaligned adjacent frames. Thus, unlike in a typical conventional co-registration where every frame is directly aligned against the initial reference frame, in a sequential alignment referred to herein, alignment of the frames proceeds progressively from the frame that is adjacent to the initial reference frame to the frame that is farthest from the initial reference frame, and each subsequent frame is transformed so that it is aligned against its adjacent frame that has already been aligned. As a result, each frame is also (though indirectly) aligned against the initial frame.

The alignment of the frames is performed at S108 in FIG. 1A. This alignment can be accomplished by an affine transformation of each frame $I^f_i (1<i\leq N)$ against the reference frame, such as using an affine transformation operator $Ta_i$, which is selected so that in the transformed frame, referred to herein as the aligned filtered frame 18, $I^a_i = Ta_i Ta_{i-1} \ldots Ta_2 I^f_i$, the corresponding landmark points are aligned. The transformation operator $Ta_i$ describes the alignment of the $i^{th}$ unaligned frame to the $(i-1)^{th}$ unaligned frame.

For example, assume a landmark point (u',v') in $I^f_i$ is correlated to the landmark point (u,v) in the adjacent reference frame, which is either $I^f_1$ when i=2 or $I^a_{i-1}$ when i>2, and (u,v) and (u',v') are displaced from each other due to translational motion, then the affine transformation operator, $Ta_i$, may be selected so that $$I^f_{i-1}(u,v) = I^f_i(u',v') \tag{7}$$

It is not necessary that Equation (7) is true for all or any pairs of correlated landmark points. The affine transformation operator may be selected so that after the affine transformation, a measure of the total displacement between all correlated pairs of landmark points between the reference frame and the aligned frame is a minimum.

The process is repeated to align each pair of adjacent filtered frames by aligning correlated landmark points between them through an affine transformation.

This alignment may be performed sequentially starting from i=2, with $I^f_1$ as the initial reference frame. Thus, $I^f_2$ is aligned with $I^f_1$ based on $Ta_2$, $I^f_3$ is aligned with $I^f_1$ based on $Ta_2$ and $Ta_3$, and $I^f_4$ is aligned with $I^a_3$ based on $Ta_2$, $Ta_3$ and $Ta_4$, and so on, until the last filtered frame in the sequence is aligned to the reference frame.

It should be understood that the alignment may start with any frame in the sequence as the initial reference frame. For instance, either the first or the last frame may be the initial reference frame. Optionally, the un-aligned frame $I^f_3$ may be used as the initial reference frame. In this case, both $I^f_2$ and $I^f_4$ may be aligned against the $I^f_3$, and $I^f_1$ may be aligned against $I^a_2$ and $I^f_5$ may against $I^a_4$, and so on.

As can be understood, the initial reference frame does not have to be transformed to align with another frame. However, in some embodiments, it is possible to register the initial reference frame in a new coordinate system for various purposes, such as to use a simpler coordinate system, or for comparison with other sets of images.

The aligned filtered frames 18 form a sequence corresponding to the other sequences of input, filtered and deconvolved frames 10, 12, 14.

For use in the later non-linear transformation at S110, each deconvolved frame $J_i$ (where i>1) is also transformed, at S108, into an aligned deconvolved frame 16, $J^a_i$, using the same transformation function $Ta_i$ that is used to transform the corresponding filtered frame 18 $I^f_i$ into $I^a_i$. This is expected to correct for global motional displacement in the deconvolved frames.

It is expected that determining the alignment transformation of adjacent images sequentially may be more accurate as compared to determining the alignment transformation of any given image frame against a same, fixed reference frame. The reason is that the displacement between adjacent image frames tends to be smaller, as compared to frames that are further apart.

As can be understood, the affine transformation discussed above corrects mainly for translation, rotation, scaling and shearing motion between the frames. However, some imaged objects, such as a living body, tissue or organism, may undergo other types of movements or changes. For example, a retina is a biological tissue and may thus undergo complex respiratory motion. An affine transformation technique alone may not be able to correct such a complex respiratory motion with sufficient accuracy.

In particular, an affine transformation may be effective for correcting global motional displacement but may be ineffective for correcting local motional distortion. A global motional displacement is a displacement of the corresponding image points in adjacent frames in which different image points in the same image are displaced according to a same linear function. Thus, such displacement can be corrected by subjecting the image points to a same linear or affine transformation. In a local motional distortion, image points in different regions of the same image are displaced according to different relations, or according to a non-linear function. Thus, such distortions cannot be accurately corrected by an affine transformation of the entire image.

To further correct for the other types of complex or local motional distortion, the aligned filtered frames 18 are subject to a non-linear transformation for motion correction at S110.

This may be accomplished by first generating a motion-corrected deconvolved frame from the corresponding deconvolved frame, and then non-linearly transforming the filtered frame by a rank matching transformation with reference to the corrected deconvolved frame, as further illustrated next.

For ease of illustration, it is assumed below that $J_1$, the 1st frame in the sequence of deconvolved frames 14, is selected as the reference frame and it is not subjected to any transformation.

Each aligned deconvolved frame 18, $J^a_i$ (where i>1), is transformed into a motion-corrected deconvolved frame 20, $J^n_i$.

It can be considered, and is so assumed herein, that the transformed frame of the reference frame is the same as the original frame, i.e. $J^n_i = J^a_i = J_1$.

For all aligned deconvolved frames $J^a_i$, where i>1, the aligned deconvolved frame is transformed to so that $$J^n_i(x,y) = J^a_i(x_0, y_0), \quad (8)$$

where $x - W_r \leq x_0 \leq x + W_r$; and $y - W_r \leq y_0 \leq y + W_r$, and $(x_0, y_0)$ is the image point in a given neighborhood (defined by $W_r$) of $J^a_i$ that has an intensity value whose rank is equivalent to that of the image point (x,y) in the corresponding adjacent corrected (reference) frame, $J^{ref}_{(i-1)}(x, y)$, where $J^{ref}_i$ is updated as follows:

$$J^{ref}_i = \frac{(i-1) \times J^{ref}_{i-1} + J^n_i}{i}. \quad (9)$$

Experimental results show that, in at least some cases, an accurate alignment can be achieved if the neighborhood size $(2W_r + 1)$ is not smaller than the sum of the diameter for the largest local structure in the image and the maximum displacement (in pixels) between adjacent image frames. If the neighborhood size is too small, the accuracy of alignment may decrease in these cases. The proper value of $W_r$ may be empirically determined in a given application. For example, in the case of in vivo mouse retinal images, $W_r$ may be selected to be 17.

As used herein, the rank of a pixel (image point) is determined as follows. For a given neighborhood, the image points (pixels) within the neighborhood are ordered based on their intensity values, in an ascending (or descending) order. The rank of an image point (pixel) is its position in the ordered sequence. For example, in one embodiment, the image point having the lowest intensity in the neighborhood may have a rank of 1, the next lowest intensity point may have a rank of 2, and the brightest image point may have the highest rank.

For Equation (8), the neighborhood is the (2Wr+1)×(2Wr+1) neighborhood centered at (x,y). The rank of the image point $(x_0, y_0)$ in $J^a_i$ refers to the order of image point $(x_0, y_0)$ in the intensity sequence of all image points in the corresponding neighborhood of $J^a_i$ centered at (x,y). The rank of the image point (x, y) in $J^{ref}_{(i-1)}$ refers to the order of image point (x, y) in the intensity sequence of all image points in the corresponding neighborhood of $J^{ref}_{(i-1)}$ centered at (x,y).

Assuming no noise is present and no image points move across the border of the neighborhood, the movement of image points within a neighborhood should not change their intensity ranks. Thus, by matching the ranks of the image points, the movement of the image points can be accurately tracked. The transformation in Equation (8) can therefore provide an accurate non-linear transformation where the corresponding image points in $J^a_i$ and $J^{ref}_{(i-1)}$ are aligned, even when there are variations in the average intensity levels of their respective neighborhoods.

As can be understood, for the assumption that the intensity ranking within the neighborhood is not altered by movement to hold strictly true, noise must be absent in $J^{ref}_{(i-1)}$, as noise may significantly alter the ranking of the image points. Thus, noise should be minimized in the frames that are used as the basis for motion correction. To this end, it is found that noise is sufficiently removed in the deconvolved frames $J_i$ ($1 \leq i \leq N$), where noise is further eliminated by deconvolution. The deconvolved images $J_i$ serve as a-priori estimates of the ideal images that have no noise and have a high resolution. They are therefore useful for guiding the rank-matching operation of Equation (10).

It can now be appreciated that, the rank matching method described herein can provide a significant improvement to the alignment accuracy over a conventional standard motion compensation operations such as an affine transformation. It is expected that the result of the rank matching non-linear transformation described herein is not significantly affected by (i) variations in the average intensity levels of the fluorescence signal in the input image frames, (2) noise in the input image frames, and (3) local motion displacements between different image frames due to the inherent dynamics of complex biological tissues.

As can be understood, the frames $J^{ref}_i$ form a sequence of reference deconvolved frames.

The frame $J^n_{i-1}(x, y)$ is expected to have been corrected for motional distortion.

The corresponding ith aligned frame $I^a_i$ is then transformed into a non-linearly motion-corrected frame 22, $I^n_i$, under a non-linear transformation for motion correction. The non-linear transformation may include a pixel rank matching (also referred to as rank order selection) transformation with reference to the corresponding reference deconvolved frame, so that $$I^n_i(x,y) = I^a_i(x_p, y_p), \quad (10)$$

where the image point $(x_p, y_p)$ is selected such that, it is within the $(2W_r+1) \times (2W_r+1)$ neighborhood centered around (x,y), and such that the rank of $I^a_i(x_p, y_p)$ is equivalent to that of the image point (x,y) in the corresponding adjacent reference deconvolved frame, $J^{ref}_{i-1}(x, y)$.

The non-linear transformation applied to $I^n_i$ described above is referred to herein as non-linear transformation based on rank matching.

As discussed above, in appropriate cases, the non-linear transformation based on rank matching can provide a significant improvement in terms of alignment accuracy over standard motion compensation techniques such as affine transformation. At the same time, it can also achieve a SNR level comparable to conventional frame averaging and motion compensated frame averaging methods.

As can be appreciated, as the non-linear transformation is performed sequentially from an initial reference frame, more accurate motion correction may be obtained. The initial reference frame does not need to be subject to a non-linear transformation, as no movement correction is necessary for the initial frame.

As discussed above, the sequential alignment procedure reduces the possibility of aligning two images which are significantly displaced from each other.

The transformation (including both affine and non-linear transformation) described above has been found to provide accurate automatic motion correction. As can be understood, in these transformations, the relative motion of the image points in the filtered frames 12 are accessed by correlating these image points to corresponding image points in the deconvolved frames (including frames 14, 18, and 20), which can be more conveniently and better correlated due to the enhanced fluorescence signal. Thus, the deconvolved frames are conveniently used as reference frames for motion correction of the filtered frames 12.

At S112, all of the non-linearly motion-corrected frames 22 $I''_i$ are sequentially and progressively averaged to generate a resultant image frame 24, denoted as $I_A$.

In an exemplary embodiment, the averaging may be carried out as follows. Assuming $I_1^{ref}=I_1$, a reference frame $I_1^{ref}$ for each motion-corrected filtered frame $I''_i$ (i>1) is generated according to Equation (11), $$I_i^{ref} = \frac{(i-1) \times I_{i-1}^{ref} + I_i^n}{i}. \quad (11)$$

The last reference frame $I_N^{ref}$ is then selected as the resultant frame, i.e., $$I_A = I_N^{ref}. \quad (12)$$

In this approach, $I_i^{ref}$ is updated at every iteration (I) and as such, the sensitivity of $I_A$ to image outliers in any given frame in the sequence is reduced.

Figure 2:
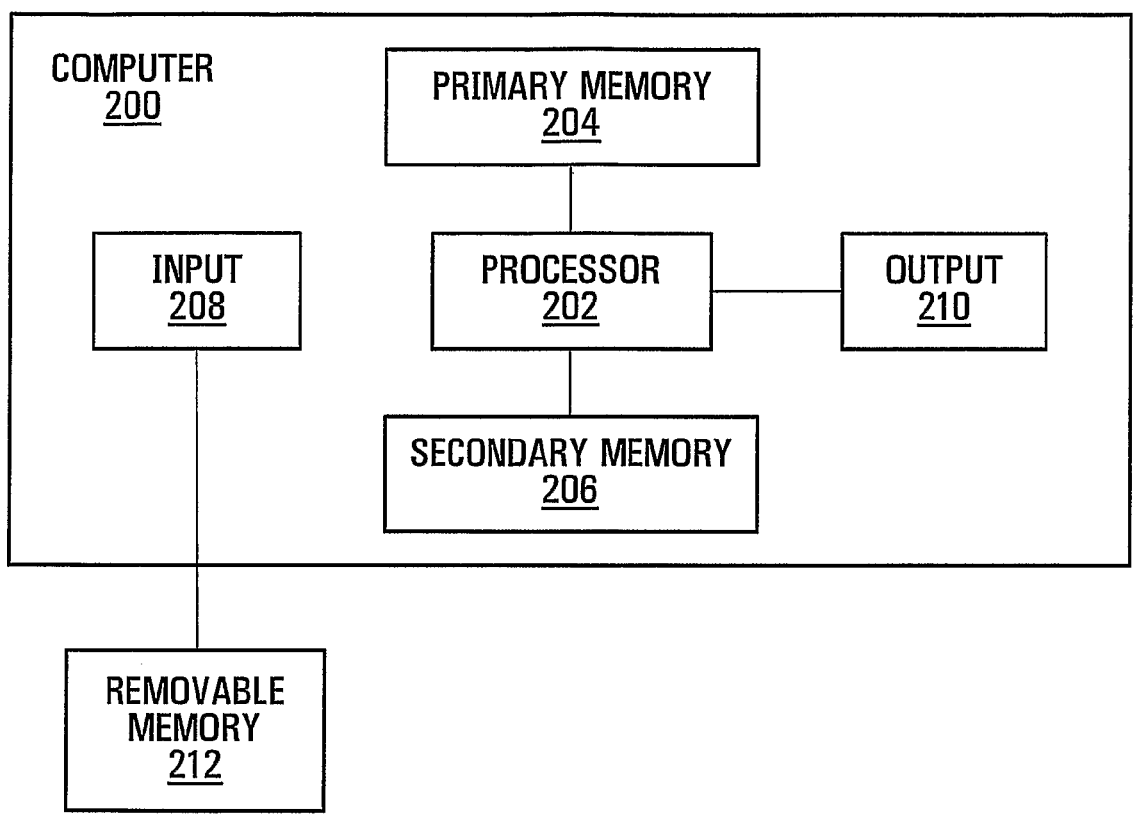
FIG. 2 is a block diagram of a computer for performing the process of FIG. 1A, exemplary of embodiments of the present invention.

According to an exemplary embodiment of the present invention, process S100 is automatically performed by a computing device or computer 200, as illustrated in FIG. 2.

Computer 200 has a processor 202, which communicates with primary memory 204, secondary memory 206, input 208 and output 210. Computer 200 may optionally communicate with a network (not shown).

Processor 202 includes one or more processors for processing computer executable codes and data.

Each of memories 204 and 206 is an electronic storage comprising a computer readable medium for storing electronic data including computer executable codes. Primary memory 204 is readily accessible by processor 202 at runtime and typically includes a random access memory (RAM). Primary memory 204 only needs to store data at runtime. Secondary memory 206 may include persistent storage memory for storing data permanently, typically in the form of electronic files. Secondary memory 206 may also be used for other purposes known to persons skilled in the art. A computer readable medium may be any available media accessible by a computer, either removable or non-removable, either volatile or non-volatile, including any magnetic storage, optical storage, or solid state storage devices, or any other medium which may embody the desired data including computer executable instructions and can be accessed, either locally or remotely, by a computer or computing device. Any combination of the above is also included in the scope of computer readable medium.

Input 208 may include one or more suitable input devices, and typically includes a keyboard and a mouse. It may also include a microphone, a scanner, a camera, an imaging device, and the like. It may also include a computer readable medium such as removable memory 212 and the corresponding device for accessing the medium. Input 208 may be used to receive input from the user. An input device may be locally or remotely connected to processor 202, either physically or in terms of communication connection.

Output 210 may include one or more output devices, which may include a display device, such as a monitor. Suitable output devices may also include other devices such as a printer, a speaker, a communication device, and the like, as well as a computer writable medium and the device for writing to the medium. Like an input device, an output device may be local or remote.

Computer 200 may communicate with other computer systems (not shown) on a network (not shown).

It will be understood by those of ordinary skill in the art that computer 200 may also include other, either necessary or optional, components not shown in the figure.

Memory 204, 206 or 212 may store computer executable code, which when executed by processor 202 causes computer 200 to carry out any of the methods, processes, procedures or algorithms described herein, or a portion thereof.

For example, the computer executable code may include code for performing the image processing described above and shown in FIGS. 1A, 1B, and 1C.

As can be appreciated, methods and processes described herein, or any portion thereof, may also be carried out using a hardware device having circuits for performing one or more of the described calculations or functions. For example, the functions of one or more of the above mentioned program code may be performed by a computing circuit.

In an exemplary embodiment of the present invention, a sequence of image frames taken from a same living object with a fluorescence imaging technique may be processed as follows. A noise-reducing filter, such as a multi-scale Gaussian filter, is applied to the image frames to generate a first sequence of filtered frames with reduced noise. A signal-enhancing filter, such as a diffusion filter, is applied to the first sequence of filtered frames to generate a second sequence of filtered frames with enhanced fluorescent signal. The first sequence of filtered frames are transformed to motion-corrected frames, wherein the transformation includes correlating image points in the first sequence of filtered frames to image points in the second sequence of filtered frames for assessing relative motion of image points in the first sequence of filtered frames. The motion-corrected frames are progressively averaged to generate a resultant frame.

An image signal in an image refers to the intensity profile in an image that is reflective of an underlying physical or biological structure or signal source in the imaged object. A signal in an image or image frame is enhanced when the processed (enhanced) image is more suitable than the original image for a specific application related to the signal. For example, a signal is enhanced if it is clearer, or easier to identify, or has better defined boundaries, or a combination of the above. The image signal may be enhanced using techniques such as noise removal, segmentation, subtraction, edge finding, smoothing, sharpening, diffusion, Fourier transformation, gray level transformation, Gaussian transformation, or the like. A description of some of these techniques used in image processing in general is provided in *Digital Image Processing*, by Rafael C. Gonzalez and Richard E. Woods, 2nd ed., 2002, Prentice Hall, New Jersey, the entire contents of which are incorporated herein by reference.

A fluorescent signal refers to an intensity profile in the image that is reflective of the underlying fluorescence produced by the imaged object. It has been found that applying a diffusion filter to a fluorescent image can advantageously enhance the underlying fluorescent signal in the image, particularly when the image has a low SNR.

Transformation of filtered frames to motion-corrected frames may include affine transformation to correct global motional displacement and non-linear transformation to correct local motional distortion, as illustrated above within the process S100. Both the affine transformation and the non-linear transformation may include correlating image points between the two sequences of filtered frames. The non-linear transformation may be the rank matching transformation described herein, and illustrated above in S100.

The rank matching non-linear transformation described above may be adapted to improve alignment or correct for motional distortion of other types of sequenced image frames. In an exemplary embodiment of the present invention, a method of averaging a sequence of input image frames taken over a period of time may be performed as follows. A corresponding sequence of deconvolved frames are generated from the input frames. The deconvolved frames may be generated using an anisotropic diffusion filter. Optionally, the deconvolved frames may be further filtered using a median filter and may be de-blurred through a blind de-convolution operation. Both the input frames and the deconvolved frames are aligned respectively, through a same affine transformation, to correct for motional displacement. The aligned deconvolved frames are further subjected to a non-linear transformation to correct for motional distortion, thus generating corrected deconvolved frames. The aligned input frames are then subjected to a rank matching non-linear transformation with reference to the corrected deconvolved frames. The rank matching non-linear transformation may be carried out as described above. The input frames may be a sequence of filtered frames but may also be other types of frames. The motion-corrected input frames may then be further analyzed or used for any desired application.

In a further embodiment, a multi-scale Gaussian filter technique may be used to filter other types of images. In this embodiment, a sequence of image frames may be processed as follows. A plurality of Gaussian filters are applied to each one of the image frames to generate a plurality of Gaussian maps associated with each image frame. Each Gaussian filters is characterized by a distinct filter width and a standard deviation dependent on the filter width. A filtered frame corresponding to each image frame is generated by assigning each image point in the filtered frame an intensity equaling a maximum intensity at the image point in the Gaussian maps associated with that image frame. The sequence of filtered frames are averaged, such as by progressive averaging, to generate a resultant frame. When desirable in a particular application, the filtered frames may be subjected to further processing, such as motion correction, prior to being averaged.

EXAMPLES

Example image frames were processed according to the process S100 using computer 200.

The processes used for processing these image frames included an algorithm which is illustrated with the following pseudocode:

```
=====================================
%% Begin Pseudocode
Loop from i = 1 to N
{       execute subprocess S102 to generate filtered frame $F_i$ from raw
            frame $I_i$
        execute subprocess S104 to generate deconvolved frame $J_i$ from
            filtered
frame $I_i$
        execute subprocess S160 to identify landmark points in $J_i$
        If i > 1
        {       execute S162 to correlate landmark points in $J_i$ and $J_{i-1}$
                execute S108 to align $F_i$ with $I^a_{i-1}$, generating aligned frame $I^a_i$
                execute S110 to correct alignment of $I^a_i$ to $I^{ref}_{i-1}$, generating
                corrected
                    frame $I^n_i$ and reference frame $I^{ref}_i$
                $I_A = [(i-1)*I_A + I^n_i] / i$
        ELSE
                $I_A = F_i$
        } end if i > 1
```

```
} end loop from i = 1 to N
%% End Pseudocode
=====================================
```

Example I

Figure 3A:
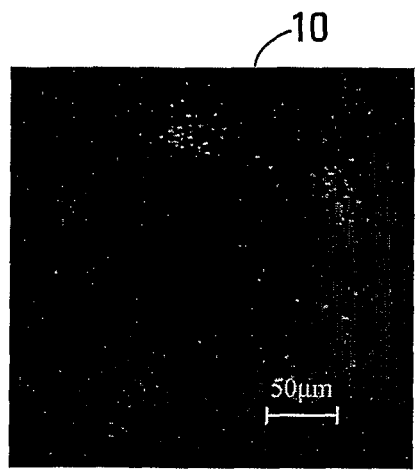
FIG. 3A is a representative input frame of an image.

A sample raw frame of a GFAP-GFP image of a mouse retina taken in vivo and processed in this Example is shown in FIG. 3A.

Figure 3B:
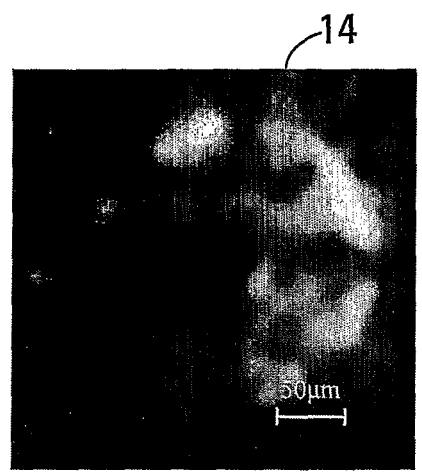
FIG. 3B is a sample deconvoluted frame generated from the input frame of FIG. 3A according to the process of FIG. 1A and FIG. 1B, FIGS. 3C and 3D are comparison frames generated from the input frame of FIG. 3A.

FIG. 3B shows a deconvolved frame generated from a filtered frame which is in turn generated from the raw frame of FIG. 3A, after the application of a multi-scale Gaussian filter and a deconvolution filter. As can be seen, the underlying features in the image were enhanced without significant distortion in FIG. 3B. This result indicates that, in this case, subjecting the filtered frame to deconvolution facilitates accurate estimation of the underlying fluorescence signal in the filtered frame.

Figure 3C:
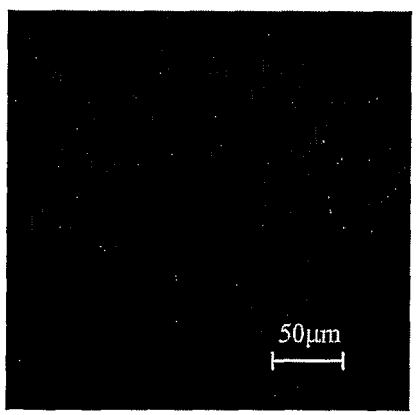

FIG. 3C shows a comparison frame generated from the filtered frame of FIG. 3B by applying a 9×9 median filter only. The underlying signal was less enhanced as compared to FIG. 3B. Some image artifacts were visible in FIG. 3C, but were absent in FIG. 3B.

Figure 3D:
Figure 5A:
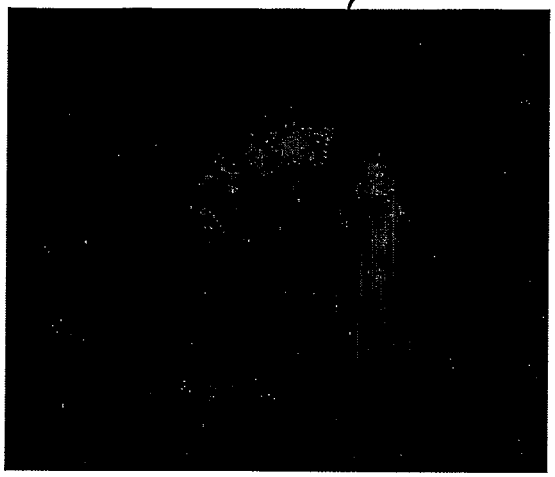
FIGS. 5A, 5B, 5C, 5D, 6A, 6B, 6C, and 6D are representative resultant frames, generated according the process of FIG. 1A.
Figure 5B:
Figure 5C:
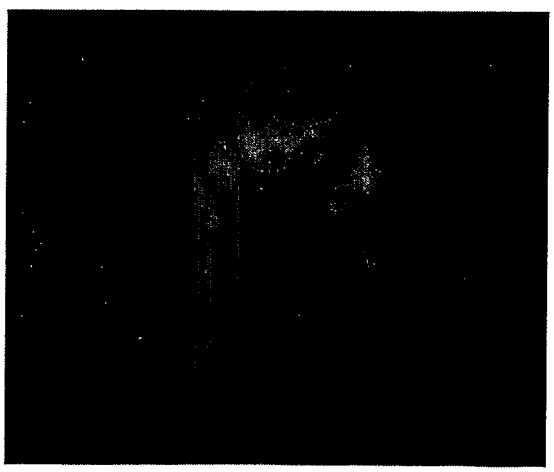
Figure 5D:
Figure 6A:
Figure 6B:
Figure 6C:
Figure 6D:
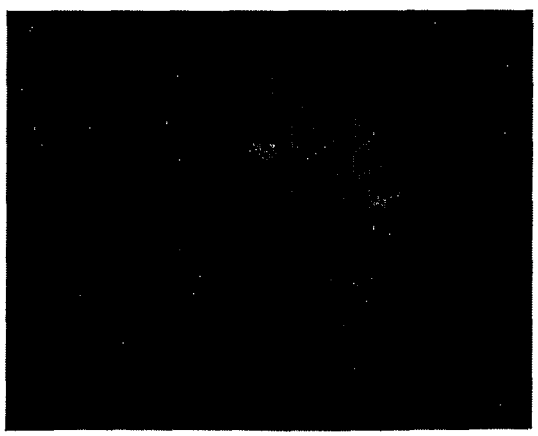

FIG. 3D shows a comparison frame which was generated by simple averaging.

FIGS. 4A, 4B, 4C, and 4D show a representative sequence of four filtered frames 12A, 12B, 12C, and 12D and the correlation between different landmark points 28A, 28B, 28C, 28D, 28E therein. The corresponding landmark points are tracked with the same affix letter A to E respectively. FIG. 4A shows the first filtered frame 12A in the sequence, FIG. 4B shows the second filtered frame 12B in the sequence, FIG. 4C shows the third filtered frame 12C in the sequence, and FIG. 4D shows the fourth filtered frame 12D in the sequence. As can be seen, some corresponding pairs of landmark points (e.g. 28E and 28F) do not appear in all frames.

Example II

Raw image frames were obtained from the retina of two different mice having the FVB/N strain, using a Heidelberg Retina Angiograph (HRA2) system. A blue laser (488 nm) was used to excite the transgenic GFAP-GFP expression and the barrier filter was set at 500 nm. The field of view was originally set to 30° but the images displayed here are of a more localized region around the optic nerve head since this is the region of interest. All retinal images have a transverse resolution of 10 um. The raw retinal images were acquired over two weeks at specific time points (different days). At the onset of the experiment, immediately after retinal imaging on day zero, the control mice was injected with saline and the treated mice was injected with kainic acid, intraperitoneally. A sequence of raw images were taken each day and were averaged according to the process S100 as further detailed in the Example above to obtain a resultant image for that day. The parameters used for the averaging process were: Wr=17, T=5, $NCC_{th}$=0.9, $W_c$=11, and N=55.

FIGS. 5A, 5B, 5C, and 5D show the resultant images for the control mice, and FIGS. 6A, 6B, 6C, and 6D show the resultant images for the treated mice, in the order of day zero, day 3, day 7, and day 14, respectively.

From these resultant images, it was observed that the two mice had different base-line fluorescence at Day zero prior to the administration of saline or kainic acid. Variation in the orientation and size of the fluorescing region between the two mice, and as time progressed, was also observed. It was also observed that a region of interest (ROI) initially defined in the Day zero image deformed or warped as time progressed.

Using the above resultant images, the fluorescence in the retina images could be normalized and analyzed, and good results were obtained.

Test results show that the resultant frames shown in FIGS. 5A, 5B, 5C, 5D, 6A, 6B, 6C, and 6D had a significantly better resolution than those obtained by direct frame averaging (see e.g. FIG. 3D) or simple averaging after only affine transformation.

Example III

The averaging results obtained using a multi-scale Gaussian filter (MSGF), with 3 Gaussian maps (T=3), as described above, and immediate arithmetic averaging, were compared with other averaging techniques, including direct frame averaging (DFA) and fixed scale Gaussian filtering (FSGF). The comparison was done using ten Lena raw images where each raw image was corrupted by an instance of Gaussian noise with an SNR of 10 db.

Figure 7A:
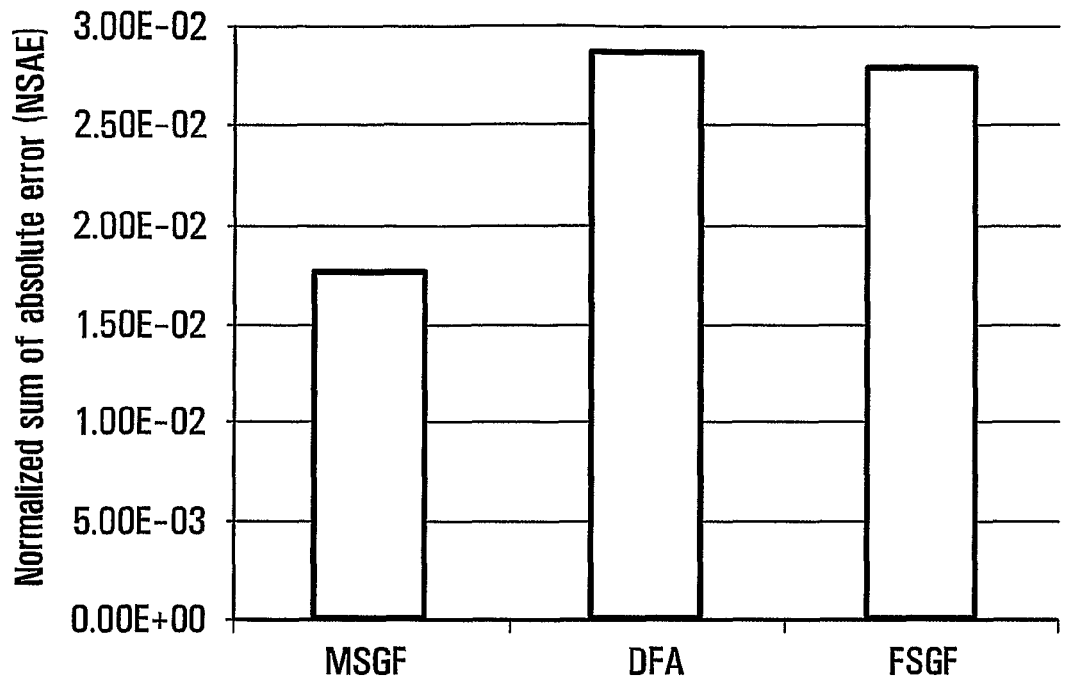
FIG. 7A is a bar graph showing the error dependence on the type of filter used.
Figure 7B:
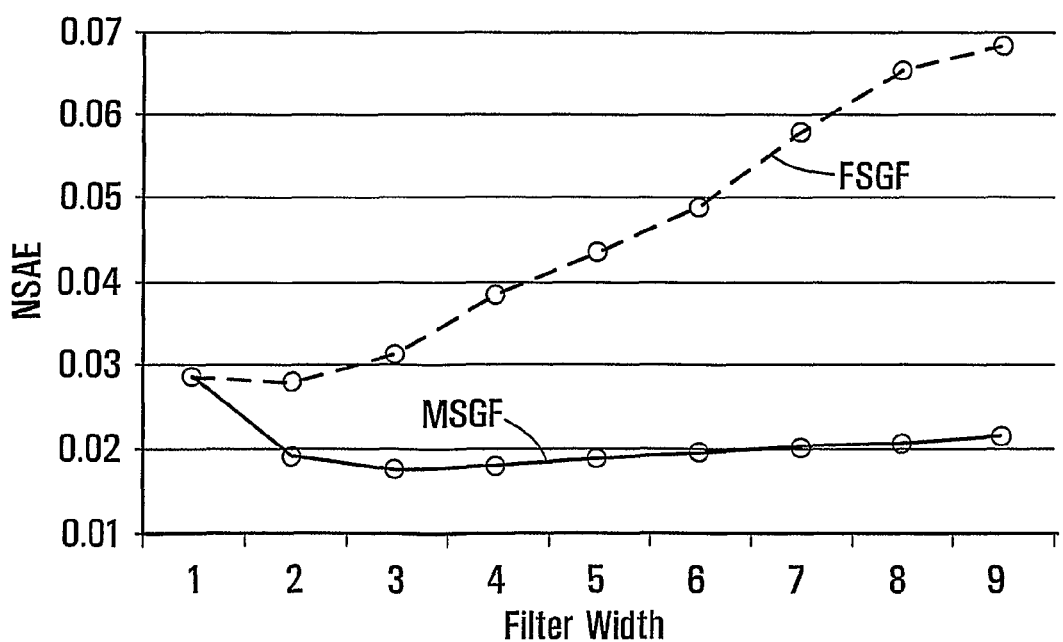
FIG. 7B is a line graph showing the error dependence on the filter width.

It was found that the resultant image generated according to MSGF had a lower normalized sum of absolute error (NSAE) than those generated according to DFA or FSGF, as shown in FIGS. 7A and 7B. In FIG. 7B, the filter width value indicates the largest filter width (=T) for MSGF and the fixed filter width for FSGF. FIG. 7B also shows that the NSAE for MSGF remained relatively constant for T>1, while the NSAE for FSGF increased with its fixed filter width. When the fixed filter width was 2, the NSAE for FSGF was the lowest, but still larger than that of MSGF for any T>1.

Example IV

Calculations showed that alignment error was significantly reduced after both affine transformation and non-linear transformation to correct for motional distortion. It was also found that sequential alignment (against corrected adjacent frame) produces the lowest alignment error, as compared to aligning all frames against a fixed reference frame or the uncorrected adjacent frame. While affine transformation improves alignment of the image frames, non-linear transformation for motional correction further improves alignment significantly. It was also found that better performance of non-linear transformation was achieved when the neighborhood width ($W_n$) was increased. The best result was obtained when $W_n$=22.

As can be understood, the exemplary process described herein can be used advantageously to process sequence of images that have low SNR and that may potentially have motional distortion, particularly local or complex motional distortion. For example, in vivo fluorescence images of transgenic GFAP-GFP expression in the mouse retina have very SNR and may involve complex motion. These images may be conveniently processed using embodiments of the present invention.

The exemplary embodiments described herein can result in improved noise suppression and resolution, as compared to conventional averaging methods. They can be used to provide both qualitative and quantitative analyses of molecular signal on retinal images acquired from living mouse, which may be used to model human diseases, such as Parkinson disease, Alzheimer's disease, diabetes, liver insufficiency, kidney failure, and the like. With these techniques, it is possible to pattern processing and recognizing the GFP-labelled retinal glia and the associated blood vessel networks. Thus, the transgenic mouse retina may be used as a site for diagnosis of retinopathies, for screening of compound neurotoxicity and efficacy, and for monitoring angiogenesis during cancer therapy development by using a quantifiable molecular imaging method.

Embodiments of the present invention may be used to quantify GFP signal and detect pattern change in blood vessel networks on retinal images obtained from a mouse. The mouse may be used to model Parkinsonism or Alzheimer's disease induced by neurotoxicants or transgenics. The mouse may be a transgenic mice treated with neurotoxicants, or pesticides, or food additives, or environmental contaminants. The mouse may be a mice with retinopathies originated from the eye, CNS, or other systemic diseases, such as diabetes, liver diseases, kidney diseases, hypertension, vascular diseases, congenital heart disease, rheumatoid arthritis, multiple sclerosis, neurofibromatosis, Lyme neuroborreliosis, Down's syndrome, autism, sickle cell anaemia, infections with HIV and cytomegalovirus, thyroid disorders. The mice may be treated with drug candidates for the assessment of gliosis and neurotoxicity, or efficacy.

Embodiments of the present invention may also be used to quantify fluorescent or bioluminescent signal and detect pattern change in blood vessel networks on retinal images obtained from mice administered with exogenous imaging agent(s), or from mice expressing other fluorescent or bioluminescent reporters injected with exogenous imaging agent(s).

The processes described herein can also be used to process various types of images such as confocal images, MRI images or pet images.

Other features, benefits and advantages of the embodiments described herein not expressly mentioned above can be understood from this description and the drawings by those skilled in the art.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of averaging a sequence of image frames taken from a living object with a fluorescent imaging technique, said method comprising:

applying a noise-reducing filter to said image frames to generate a sequence of filtered frames;

applying a deconvolution filter to said sequence of filtered frames to generate a corresponding sequence of deconvolved frames;

subjecting said deconvolved frames to a motion-correction transformation to generate a sequence of corrected deconvolved frames, wherein the ith corrected deconvolved frame is represented by $J_i^{ref}(x,y)$, $J_i^{ref}$ being the intensity at image point (x,y) in the ith corrected deconvolved frame;

transforming said filtered frames by an affine transformation to align said filtered frames, thus generating a sequence of aligned frames, wherein an ith aligned frame is represented by $I_i^a(x,y)$, $I_i^a$ being the intensity at image point (x,y) in the ith aligned frame;

relocating image points in each aligned frame to generate a motion-corrected frame, wherein an ith motion-corrected frame is represented by $I_i^n(x,y)$, $I_i^n$ being the intensity at image point (x,y) in the ith motion-corrected frame, $I_i^n(x,y)=I_i^a(x_p,y_p)$, and wherein the location ($x_p$, $y_p$) is selected such that (i) said location is within a neighborhood centered around (x,y), and
(ii) an intensity rank of $I_i^a(x_p,y_p)$ in said neighborhood and an intensity rank of $J_{i-1}^{ref}(x,y)$ in said neighborhood are the same,
thus generating a sequence of motion-corrected frames; and
averaging said motion-corrected frames to generate a resultant frame.

2. The method of claim 1, wherein the total number of motion corrected frames is N, and wherein said averaging comprises:
generating a sequence of reference frames, wherein an ith one of said reference frames is represented by $I_i^{ref}$ and is calculated as $$I_i^{ref} = \frac{(i-1) \times I_{i-1}^{ref} + I_i^n}{i};$$

and
generating said resultant frame according to $I_A = I_N^{ref}$, $I_A$ representing said resultant frame.

3. The method of claim 1, wherein said motion-correction transformation of said deconvolved frames comprises
transforming said deconvolved frames by an affine transformation to align said deconvolved frames, thus generating a sequence of aligned deconvolved frames, wherein an ith aligned deconvolved frame is represented by $J_i^a(x,y)$, $J_i^a$ being the intensity at image point (x,y) in the ith aligned deconvolved frame;
relocating image points in each aligned deconvolved frame to generate a motion-corrected deconvolved frame, wherein an ith motion-corrected deconvolved frame is represented by $J_i^n(x,y)$, $J_i^n$ being the intensity at image point (x,y) in the ith motion-corrected deconvolved frame, $J_i^n(x,y) = J_i^a(x_0,y_0)$, and wherein the location $(x_0, y_0)$ is selected such that
(i) said location $(x_0,y_0)$ is within a neighborhood centered around (x,y), and
(ii) an intensity rank of $J_i^a(x_0,y_0)$ in said neighborhood and an intensity rank of $J_{i-1}^{ref}(x,y)$ in said neighborhood are the same.

4. The method of claim 3, wherein said ith corrected deconvolved frame is generated according to $$J_i^{ref} = \frac{(i-1) \times J_{i-1}^{ref} + J_i^n}{i}.$$

5. The method of claim 1, comprising:
establishing point-to-point correlation between corresponding landmark points in each adjacent pair of said deconvolved frames;
establishing point-to-point correlation between corresponding landmark points in each adjacent pair of said filtered frames, guided by said point-to-point correlation between said corresponding landmark points in said deconvolved frames; and
wherein said transforming said filtered frames by said affine transformation comprises aligning corresponding landmark points in each adjacent pair of said aligned frames.

6. The method of claim 5, wherein said establishing said point-to-point correlation between said corresponding landmark points in said each adjacent pair of said deconvolved frames comprises:
calculating a normalized cross-correlation (NCC) measure for each pair of said corresponding landmark points;
determining that said pair of landmark points are correlated when said NCC measure satisfies a pre-selected condition.

7. The method of claim 1, wherein said sequence of filtered frames are generated by:
applying a plurality of Gaussian filters to each one of said image frames to generate a plurality of Gaussian maps associated with said each image frame, each one of said Gaussian filters is characterized by a distinct filter width and a standard deviation dependent on said filter width;
generating a filtered frame corresponding to said each image frame, by assigning each image point in said filtered frame an intensity equaling a maximum intensity at said each image point in said plurality of Gaussian maps associated with said each image frame, thus generating said first sequence of said filtered frames.

8. The method of claim 7, wherein the intensity, $M_{i,j}(x,y)$, at an image point (x,y) in the jth Gaussian map associated with the ith image frame in said sequence of image frames is calculated by $$M_{i,j}(x,y) = \sum_{x_j} \sum_{y_j} h_j(x-x_j) h'_j(y-y_j) I_i(x_j, y_j),$$

where the summation is over possible $x_i$ and $y_h$ that satisfy $(x-w_j) \leq x_j \leq (x+w_j)$ and $(y-w_j) \leq y_j \leq (y+w_j)$, and
wherein $I_i(x,y)$ is the intensity at said image point (x,y) in said ith image frame,
$h_j(u) = \exp(-u^2/2\sigma_j^2)$ is a Gaussian transfer function for the jth Gaussian filter, u representing a one dimensional variable,
$h'_j(u)$ is the transpose of $h_j(u)$,
$\sigma_j$ is a standard deviation, and
$w_j$ is a filter width for said jth Gaussian filter.

9. The method of claim 8, wherein $w_j = j$.

10. The method of claim 8, wherein $\sigma_j$ is selected so that it has the largest value that satisfies $\exp(-w_j^2/2\sigma_j^2) \leq 10^{-3}$.

11. The method of claim 8, wherein said plurality of Gaussian filters consists of 3 to 10 Gaussian filters.

12. The method of claim 1, wherein said living object is a mouse retina.

13. The method of claim 1, wherein said fluorescent imaging technique is a glial fibrillary acidic protein-green fluorescence protein (GFAP-GFP) imaging technique.

14. A computer comprising a processor and a computer readable medium storing thereon computer-executable instructions which, when executed by said processor, adapts said computer to perform the method of claim 1.

15. A non-transitory computer readable medium storing thereon computer-executable instructions which, when executed by a processor, adapts said processor to perform the method of claim 1.

* * * * *

UNITED STATES PATENT AND TRADEMARK OFFICE
CERTIFICATE OF CORRECTION

PATENT NO. : 8,428,318 B2
APPLICATION NO. : 12/598592
DATED : April 23, 2013
INVENTOR(S) : Lang Zhuo, Saravana Kumar and Gideon Ho Page 1 of 1

It is certified that error appears in the above-identified patent and that said Letters Patent is hereby corrected as shown below:

In the Claims:

Column 20, In claim 8, line 32, "$x_i$ and $y_h$" should read --$x_j$ and $y_j$--.

Signed and Sealed this
Thirtieth Day of July, 2013

Teresa Stanek Rea
*Acting Director of the United States Patent and Trademark Office*